United States Patent
Choi

(10) Patent No.: US 6,219,485 B1
(45) Date of Patent: Apr. 17, 2001

(54) METHOD AND APPARATUS FOR AUTOMATICALLY ADJUSTING THE AMPLITUDE OF A COLOR BURST SIGNAL

(75) Inventor: Bong-Youl Choi, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/039,312

(22) Filed: Mar. 16, 1998

(30) Foreign Application Priority Data

Mar. 17, 1997 (KR) ................................... 97-8938
May 9, 1997 (KR) .................................. 97-17971

(51) Int. Cl.[7] ............................... H04N 9/79; H04N 9/45
(52) U.S. Cl. .................... 386/1; 386/10; 348/505
(58) Field of Search ............................ 386/1, 10–11, 386/45; 348/505, 506, 507, 508, 509, 645, 646, 647, 648, 528, 549, 453, 708; H04N 9/79, 9/45, 9/455

(56) References Cited

U.S. PATENT DOCUMENTS

| | | | |
|---|---|---|---|
| 5,251,014 | * 10/1993 | Inoue et al. | 348/505 |
| 5,351,091 | * 9/1994 | Hosoya et al. | 348/505 |
| 5,404,230 | * 4/1995 | Hong | 348/506 |
| 5,481,313 | * 1/1996 | Kim | 348/505 |
| 5,757,439 | * 5/1998 | Kim | 348/645 |
| 5,774,184 | * 6/1998 | Murakami | 348/506 |
| 5,844,621 | * 12/1998 | Ngo et al. | 348/505 |

* cited by examiner

Primary Examiner—Thai Tran
(74) Attorney, Agent, or Firm—Pennie & Edmonds LLP

(57) ABSTRACT

A novel method effectively adjusts the amplitude of a color burst signal in a chrominance of a composite video signal read by a reproducing head from a magnetic tape. A low pass filtered chrominance signal of 629 KHz obtained from the composite video signal is filtered to detect an original chrominance signal of 3.58 MHz. Also an original color burst signal is extracted from the chrominance signal by using a burst gate pulse generated by a burst gate pulse generator in a video cassette recorder system. The color burst signal is converted to that of a digital value corresponding thereto and comparing an amplitude of the converted color burst signal with a predetermined threshold value to provide a device control signal corresponding to the comparison result. In response to the device control signal, the color burst signal is selectively deemphasized to a predetermined level; and either one of the deemphasized color signal and the extracted color burst signal is selectively outputted.

14 Claims, 2 Drawing Sheets

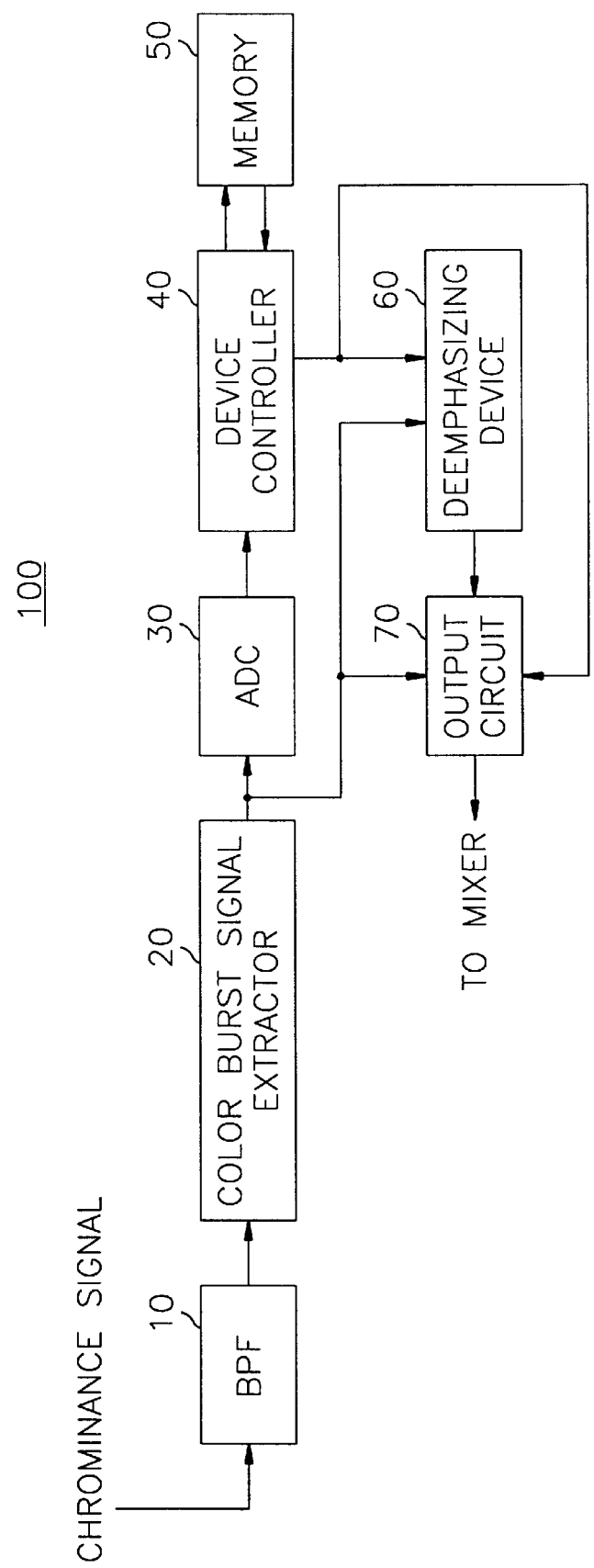

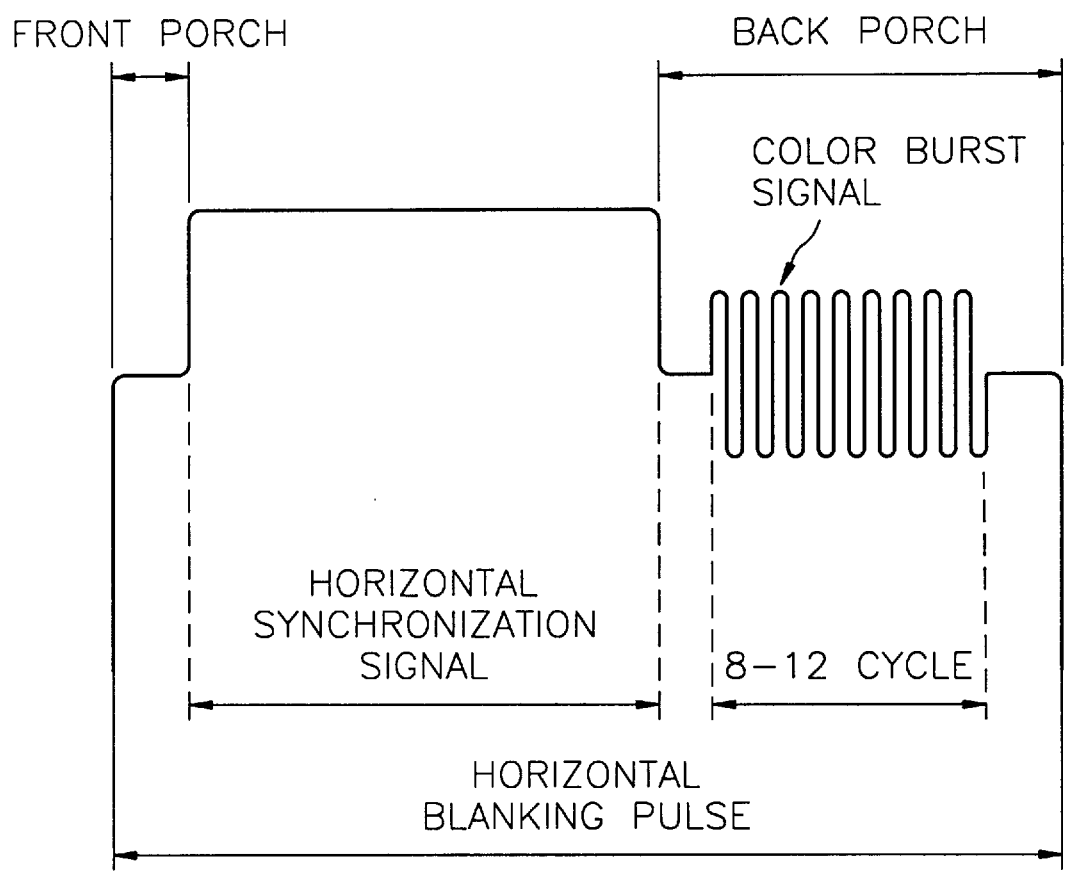

METHOD AND APPARATUS FOR AUTOMATICALLY ADJUSTING THE AMPLITUDE OF A COLOR BURST SIGNAL

FIELD OF THE INVENTION

The present invention relates to a video cassette recorder (VCR); and, more particularly, to a method and an apparatus, for use in the VCR, for automatically adjusting the amplitude of a color burst signal contained in a chrominance signal.

BACKGROUND OF THE INVENTION

As is well known, most VCRs are provided with the capability of recording audio and video signals on audio and video tracks of a video tape, respectively, at one of several tape running speeds, e.g., standard playback (SP), long playback (LP), super long playback (SLP), according to a user's selection. In order to reproduce the audio and video signals recorded on the audio and video tracks at a same tape running speed as that chosen for their recording, mode information on the tape running speed is normally recorded together with other control information on a control track of the video tape.

In addition, in a recording system of a VCR, a color burst signal, which is known to be a reference signal to synchronize the phase of, e.g., 3.58 MHz color oscillator in a reproducing system of the VCR, is recorded on the video track of the video tape. Such a color burst signal, as is well known in the art, is inserted in a back porch of a horizontal synchronization signal in each horizontal blanking pulse of a composite video signal, as illustrated in FIG. 2. As shown in FIG. 2, the color burst signal is comprised of 8 to 12 cycles of, e.g., 3.58 MHz subcarrier, and the peak value thereof is one-half the horizontal synchronization signal. Peak-to-peak of the color burst signal equals the amplitude of the horizontal synchronization signal.

In case the composite video signal is recorded at one of the two tape running speeds of SP and SLP, the color burst signal is recorded after emphasizing the level thereof to, e.g., 6 dB, at an emphasizing device of the recording system. That is, at the emphasizing device, the amplitude of the color burst signal is amplified, e.g., two times, thereby emphasizing the level thereof to 6 dB. On the other hand, in case the composite video signal is recorded at the tape running speed of LP, the color burst signal is recorded after emphasizing the level thereof to 6 dB or without having no emphasis in response to an emphasis selection signal given in advance by the VCR manufacturing company. It is well known that a signal/noise (S/N) ratio of the color burst signal can increase by decreasing noises by recording the color burst signal after emphasizing it in the recording system.

In the reproducing system of the VCR, the composite video signal is read by a reproducing head of the VCR from the video track of the video tape and then is processed to reconstruct the original composite video signal. Specifically, in the reproducing system, an original chrominance signal of, e.g., 3.58 MHz is detected from the composite video signal by, e.g., band pass filters with cutoff frequencies of 629 KHz and 3.58 MHz; and then a color burst signal is extracted from the original chrominance signal by using a burst gate pulse generated by a burst gate pulse generator in the reproducing system.

Thereafter, the color burst signal is deemphasized by a deemphasizing device in the reproducing system to reconstruct an original color burst signal. In other words, in response to the mode information indicating the tape running speed of SP or SLP, read from the control track of the video tape, the color burst signal is deemphasized to a same level as that used to emphasize the color burst signal in the recording system. In response to the mode information representing the tape running speed of LP, however, the color burst signal is selectively deemphasized according to the emphasis selection signal predetermined at the emphasizing device of the recording system. That is, the color burst signal is deemphasized in response to the emphasis selection signal representing that it is preset to emphasize the color burst signal at the emphasizing device; and is not deemphasized in response to the emphasis selection signal indicating that it is preset not to emphasize the color burst signal at the emphasizing device. The non-deemphasized color burst signal or the deemphasized color burst signal is then provided to a next processor, e.g., a mixer, in the reproducing system to further process.

Since, however, the prior art reproducing system of the VCR performs the deemphasis for the color burst signal only in response to the emphasis selection signal preset at the VCR itself, without considering the amplitude of the color burst signal, the amount of the chrominance signal may decrease for instance when the color burst signal is a signal which has not been emphasized by another VCR. This results in a deterioration of the quality of the video signal reproduced by the reproducing system.

SUMMARY OF THE INVENTION

It is, therefore, a primary object of the present invention to provide a method and apparatus which is capable of improving the quality of a reproduced video signal by automatically adjusting the amplitude of a color burst signal in the reproduced video signal.

In accordance with one aspect of the invention, there is provided a method, for use in a video cassette recorder (VCR) system, for automatically adjusting an amplitude of a color burst signal in a chrominance signal of a composite video signal read by a reproducing head from a magnetic tape, the method comprising the steps of:

(a) detecting the chrominance signal from the composite video signal;

(b) extracting the color burst signal from the chrominance signal by using a burst gate pulse generated by a burst gate pulse generator in the VCR system;

(c) converting the color burst signal into that having a digital value corresponding thereto and comparing an amplitude of the converted color burst signal with a predetermined threshold value to provide a device control signal corresponding to the comparison result; and (d) in response to the device control signal, selectively deemphasizing the color burst signal to a predetermined level and outputting either one of the deemphasized color burst signal and the color burst signal extracted at the step (b).

In accordance with another aspect of the invention, there is provided an apparatus, for use in a video cassette recorder (VCR) system, for automatically adjusting an amplitude of a color burst signal in a chrominance signal of a composite video signal read by a reproducing head from a magnetic tape, the apparatus comprising:

means for detecting the chrominance signal from the composite video signal;

extraction means for extracting the color burst signal from the chrominance signal by using a burst gate pulse generated by a burst gate pulse generator in the VCR system;

control means for converting the color burst signal into that having a digital value corresponding thereto and comparing an amplitude of the converted color burst signal with a predetermined threshold value to provide a device control signal corresponding to the comparison result; and deemphasis and output means, in response to the device control signal, selectively deemphasizing the color burst signal to a predetermined level and outputting either one of the deemphasized color burst signal and the color burst signal extracted at the extraction means.

BRIEF DESCRIPTION OF THE DRAWINGS

The above and other objects and features of the present invention will become apparent from the following description of preferred embodiments taken in conjunction with the accompanying drawings, in which:

FIG. 1 is a block diagram illustrating an apparatus for automatically adjusting the amplitude of a color burst signal contained in a composite video signal reproduced in accordance with the present invention; and FIG. 2 presents an exemplary horizontal blanking pulse containing the color burst signal illustrated in FIG. 1.

DETAILED DESCRIPTION OF THE PREFERRED EMBODIMENTS

Referring to FIG. 1, there is shown a block diagram of a novel apparatus 100, for use in a VCR system (not shown), for automatically adjusting a color burst signal contained in a chrominance signal of a composite video signal read from a video tape through a reproducing head (not shown) of the VCR system in accordance with the present invention. The inventive apparatus 100 comprises a band pass filter (BPF) 10, a color burst signal extractor 20, an analog/digital converter (ADC) 30, a device controller 40, a memory 50, a deemphasizing device 60, and an output circuit 70.

A chrominance signal, which is filtered with a cutoff frequency of 629 KHz from a composite video signal read by the reproducing head from the video tape, is applied to the BPF which filters same with a predetermined cutoff frequency, e.g., 3.58 MHz, to detect an original chrominance signal of 3.5 MHz. The chrominance signal of 3.58 MHz detected is then provided to the color burst signal extractor 20, wherein a color burst signal is extracted from the chrominance signal of 3.58 MHz by using a burst gate pulse generated by a burst gate pulse generator in a reproducing system (not shown) of the VCR system.

Thereafter, the color burst signal extracted is provided to the deemphasizing device 60, the output circuit 70 and the ADC 30 which converts same into a color burst signal having a digital value corresponding thereto. A low pass filter consisting of, e.g., a resistor and a capacitor with a predetermined cutoff frequency, which is well known to those skilled in the art, may be advantageously used in lieu of the ADC 30. The digital color burst signal is then transferred to the device controller 40 which compares same with a predetermined threshold value and issues a device control signal to be used to control the operation of the deemphasizing device 60 based on the comparison result. The predetermined threshold value is retrieved from the memory 50 under the control of the device controller 40. Specifically, at the device controller 40, a logic high level is generated if the digital color burst signal is larger than the predetermined threshold value; and a logic low level is produced if otherwise. Subsequently, the logic high or low level is transferred, as the device control signal, to the deemphasizing device 60 and the output circuit 70.

In response to the device control signal of the logic high or low level, the deemphasizing device 60 selectively performs the deemphasis operation for the color burst signal from the color burst signal extractor 20. That is, the deemphasizing device 60, in response to the device control signal of the logic high level, deemphasizes the color burst signal to a same level, e.g., 6 dB, as that used to emphasize the color burst signal in a recording system (not shown) of a VCR system. In response to the device control signal of the logic low level, however, at the deemphasizing device 60, no operation is carried out. Specifically, if the device control signal of the logic low level is received by the deemphasizing device 60, then the deemphasizing device 60 regards the color burst signal as a signal which has not been emphasized by the recording system of the VCR system. In such a case, the deemphasizing device 60 performs no deemphasis operation for the color burst signal. The deemphasized color burst signal from the deemphasizing device 60 is then provided to the output circuit 70.

The output circuit 70, in response to the device control signal from the device controller 40, selectively outputs one of both color burst signals applied thereto. To be more specific, in response to the device control signal of the logic low level, the output circuit 70 outputs the color burst signal from the color burst signal extractor 20; and, in response to the device control signal of the logic high level, it outputs the deemphasized color burst signal. The output from the output circuit 70 is then transferred to a next processor, e.g., a mixer (not shown), included in a reproducing system of the VCR system to further process. As shown above, therefore, the present invention is capable of improving the picture quality of a video signal reproduced by the reproducing system by automatically adjusting the amplitude of a color burst signal based on the amplitude thereof.

While the present invention has been shown and described with respect to the particular embodiment, it will be apparent to those skilled in the art that many changes and modifications may be made without departing from the spirit and scope of the invention as defined in the appended claims.

What is claimed is:

1. A method, for use in a video cassette recorder (VCR) system, for automatically adjusting an amplitude of a color burst signal in a chrominance signal of a composite video signal read by a reproducing head from a magnetic tape, the method comprising the steps of:

(a) detecting the chrominance signal from the composite video signal;

(b) extracting the color burst signal from the chrominance signal by using a burst gate pulse generated by a burst gate pulse generator in the VCR system;

(c) converting the color burst signal into that having a digital value corresponding thereto and comparing an amplitude of the converted color burst signal with a predetermined threshold value to provide a device control signal corresponding to the comparison result; and (d) in response to the device control signal, selectively deemphasizing the color burst signal to a predetermined level and outputting either one of the deemphasized color burst signal and the color burst signal extracted at the step (b).

2. The method of claim 1, wherein the step (d) includes a step of deemphasizing the color burst signal to the predetermined level in response to the device control signal indicating that the converted color burst signal is larger than the predetermined threshold value.

3. The method of claim 2, wherein the chrominance signal at the step (a) is detected by filtering the composite video signal using a band pass filter with a predetermined cutoff frequency.

4. The method of claim 2, wherein the predetermined level is 6 dB.

5. An apparatus, for use in a video cassette recorder (VCR) system, for automatically adjusting an amplitude of a color burst signal in a chrominance signal of a composite video signal read by a reproducing head from a magnetic tape, the apparatus comprising:

means for detecting the chrominance signal from the composite video signal;

extraction means for extracting the color burst signal from the chrominance signal by using a burst gate pulse generated by a burst gate pulse generator in the VCR system;

control means for converting the color burst signal into that having a digital value corresponding thereto and comparing an amplitude of the converted color burst signal with a predetermined threshold value to provide a device control signal corresponding to the comparison result; and deemphasis and output means, in response to the device control signal, for selectively deemphasizing the color burst signal to a predetermined level and outputting either one of the deemphasized color burst signal and the color burst signal extracted at the extraction means.

6. The apparatus of claim 5, wherein the deemphasis and output means includes means for deemphasizing the color burst signal to the predetermined level in response to the device control signal indicating that the converted color burst signal is larger than the predetermined threshold value.

7. The apparatus of claim 6, wherein the control means includes a memory for storing the predetermined threshold value.

8. The apparatus of claim 6, wherein the chrominance signal is detected by filtering the composite video signal using a band pass filter with a predetermined cutoff frequency.

9. The apparatus of claim 6, wherein the predetermined level is 6 dB.

10. A video cassette recorder (VCR) system incorporating therein an automatic color burst signal amplitude adjusting apparatus for automatically adjusting an amplitude of a color burst signal in a chrominance signal of a composite video signal read by a reproducing head from a magnetic tape, the automatic color burst signal amplitude adjusting apparatus comprising:

means for detecting the chrominance signal from the composite video signal;

extraction means for extracting the color burst signal from the chrominance signal by using a burst gate pulse generated by a burst gate pulse generator in the VCR system;

control means for converting the color burst signal into that having a digital value corresponding thereto and comparing an amplitude of the converted color burst signal with a predetermined threshold value to provide a device control signal corresponding to the comparison result; and deemphasis and output means, in response to the device control signal, for selectively deemphasizing the color burst signal to a predetermined level and outputting either one of the deemphasized color burst signal and the color burst signal extracted at the extraction means.

11. The VCR system of claim 10, wherein the deemphasis and output means includes means for deemphasizing the color burst signal to the predetermined level in response to the device control signal indicating that the converted color burst signal is larger than the predetermined threshold value.

12. The VCR system of claim 11, wherein the control means includes a memory for storing the predetermined threshold value.

13. The VCR system of claim 11, wherein the chrominance signal is detected by filtering the composite video signal using a band pass filter with a predetermined cutoff frequency.

14. The VCR system of claim 11, wherein the predetermined level is 6 dB.

* * * * *